(12) United States Patent
Tennie et al.

(10) Patent No.: US 9,729,668 B2
(45) Date of Patent: Aug. 8, 2017

(54) AUTOMATIC SERVICE EXTENSIBILITY

(71) Applicants: Olaf Tennie, Heidelberg (DE);
Christoph Scheiber, Reilingen (DE)

(72) Inventors: Olaf Tennie, Heidelberg (DE);
Christoph Scheiber, Reilingen (DE)

(73) Assignee: SAP SE, Walldorf (DE)

( * ) Notice: Subject to any disclaimer, the term of this patent is extended or adjusted under 35 U.S.C. 154(b) by 330 days.

(21) Appl. No.: 14/560,942

(22) Filed: Dec. 4, 2014

(65) Prior Publication Data
US 2016/0165004 A1 Jun. 9, 2016

(51) Int. Cl.
*H04L 29/08* (2006.01)
*G06Q 10/10* (2012.01)

(52) U.S. Cl.
CPC ............ *H04L 67/32* (2013.01); *G06Q 10/10* (2013.01); *H04L 67/16* (2013.01)

(58) Field of Classification Search
CPC .......... H04L 67/32; H04L 67/16; G06Q 10/10
See application file for complete search history.

(56) References Cited

U.S. PATENT DOCUMENTS

| | | | |
|---|---|---|---|
| 7,603,260 B2 | 10/2009 | Schmitz et al. | |
| 8,412,549 B2 | 4/2013 | Graeber et al. | |
| 8,560,392 B2 | 10/2013 | Asal et al. | |
| 8,615,451 B1 | 12/2013 | Thiele et al. | |
| 2008/0163088 A1* | 7/2008 | Pradhan | G06F 9/4443 715/764 |
| 2008/0178281 A1* | 7/2008 | Narayanaswami | G06F 21/80 726/17 |
| 2009/0313467 A1* | 12/2009 | Atkins | H04L 29/06 713/155 |
| 2011/0035742 A1* | 2/2011 | Shenfield | G06F 9/44521 717/171 |
| 2011/0208788 A1* | 8/2011 | Heller | G06F 8/30 707/810 |
| 2013/0179229 A1 | 7/2013 | Graeber et al. | |
| 2014/0006221 A1 | 1/2014 | Thiele et al. | |
| 2014/0006222 A1 | 1/2014 | Hericks et al. | |
| 2014/0067907 A1* | 3/2014 | Singh | G06Q 10/10 709/202 |
| 2015/0312262 A1* | 10/2015 | Doshi | H04L 67/22 726/1 |

* cited by examiner

*Primary Examiner* — Abdullahi E Salad
(74) *Attorney, Agent, or Firm* — Fish & Richardson P.C.

(57) ABSTRACT

The disclosure generally describes computer-implemented methods, software, and systems, including a method for automatically extending a service associated with data access. A request is received from a client, the request being for data associated with a first service. The first service is identified by a service identifier included in the request and defining a first behavior associated with the first service and use of the requested data. Using the service identifier, an extension service is identified that is associated with the first service. The identifying occurs automatically based on additional registry entries for the extension service, without modifying original registry entries for the first service, and without modifying a first service implementation associated with the first service. Data responsive to the received request is provided to the client. The data is provided according to a second behavior associated with the extension service.

24 Claims, 4 Drawing Sheets

AUTOMATIC SERVICE EXTENSIBILITY

BACKGROUND

The present disclosure relates to services provided for data access.

Services are provided to clients for access to data. The access can be controlled, for example, by identifying a particular service when requesting the data associated with the service. For example, the request from a client can be in the form of application code (e.g., a function call or method call) that requests customer account information and further includes a service identifier Cust1 associated with the service. Cust1, for example, can specify the data customer account-related fields available to the client and the type of access that is allowed (e.g., read-only versus update). Over time, e.g., when additional fields are added to customer account-related information, new services may be defined and used, some of which may be similar to (or may replace) existing services.

SUMMARY

The disclosure generally describes computer-implemented methods, software, and systems for automatically extending a service associated with data access. For example, a request is received from a client, the request being for data associated with a first service. The first service is identified by a service identifier included in the request and defining a first behavior associated with the first service and use of the requested data. Using the service identifier, an extension service is identified that is associated with the first service. The identifying occurs automatically based on additional registry entries for the extension service, without modifying original registry entries for the first service, and without modifying a first service implementation associated with the first service. Data responsive to the received request is provided to the client. The data is provided according to a second behavior associated with the extension service.

For example, one computer-implemented method includes: receiving, from a client, a request for data associated with a first service, the first service identified by a service identifier included in the request and defining a first behavior associated with the first service and use of the requested data; identifying, using the service identifier, an extension service associated with the first service, the identifying occurring automatically based on additional registry entries for the extension service without modifying original registry entries for the first service and without modifying a first service implementation associated with the first service; and providing, to the client, data responsive to the received request, the data provided according to a second behavior associated with the extension service.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, identifying the extension service includes: determining, at the gateway and using a service configuration, if the first service is active; determining, at the gateway and using an authorization configuration, if a user associated with the request is allowed to use the first service; generating, at the gateway and using routing customizing, a backend request using the received request and the service identifier; providing, by the gateway, the backend request to a backend; and identifying, at the backend and using a service registration, an original service implementation for the first service; setting, at the backend, a current service implementation to the original service implementation.

In a second aspect, combinable with any of the previous aspects, identifying the extension service further includes: determining, using the service registration, if an extension exists for the current service implementation. When an extension does not exist for the current service implementation, identifying the extension service further includes accessing the current service implementation and providing, through the gateway, the current service implementation in response to the received request.

In a third aspect, combinable with any of the previous aspects, identifying the extension service further includes: when an extension exists for the current service implementation, identifying the extension service further includes determining if a customer/partner rule exists for the current service implementation. When an extension exists for the current service implementation and when a customer/partner rule exists for the current service implementation, identifying the extension service further includes selecting, using a rule engine and the customer/partner rule, an extension for the current service implementation. When an extension exists for the current service implementation and when a customer/partner rule does not exist for the current service implementation, identifying the extension service further includes selecting, using the backend, an extension for the current service implementation, using the extension as the current service implementation, and repeating determining if an extension exists for the current service implementation.

In a fourth aspect, combinable with any of the previous aspects, the computer-implemented method further includes defining the extension service, based on the first service and associated with the service identifier, and registering the extension service for use by clients.

In a fifth aspect, combinable with any of the previous aspects, creating the extension service includes using a modeling tool.

In a sixth aspect, combinable with any of the previous aspects, the extension service is extensible to an extended extension service.

In a seventh aspect, combinable with any of the previous aspects, a difference between the first behavior and the second behavior includes use of data not available in the other behavior, including one or more of: a difference between a first data model associated with the first service and a second data model associated with the extension service, including deviating behavior associated with at least one of validation and determination; and different capabilities between the first service and the extension service regarding read-only versus modifiable data.

In an eighth aspect, combinable with any of the previous aspects, the service identifier includes a name and a version.

In a ninth aspect, combinable with any of the previous aspects, the extension service is assigned to a software component and the extension service is used automatically after installing the software component on the backend; and enabling or disabling the software component by a configuration switch instead of installing/de-installing the software component.

The subject matter described in this specification can be implemented in particular implementations so as to realize one or more of the following advantages. First, software development can occur in parallel with extending a current (first) service. Second, during runtime, new interfaces are not needed for accessing an extending (second) service. This allows a service to be changed/extended without disrupting clients. Third, coding changes are not required for code that accesses the first service. Fourth, customizing and configuration activities are not needed on a gateway used to access the second service. Fifth, a client does not need to be reconfigured to access the first and second services. Sixth, life cycle problems and customer service impacts can be reduced by automatically extending services.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for automatically extending a service associated with data access.

Figure 1:
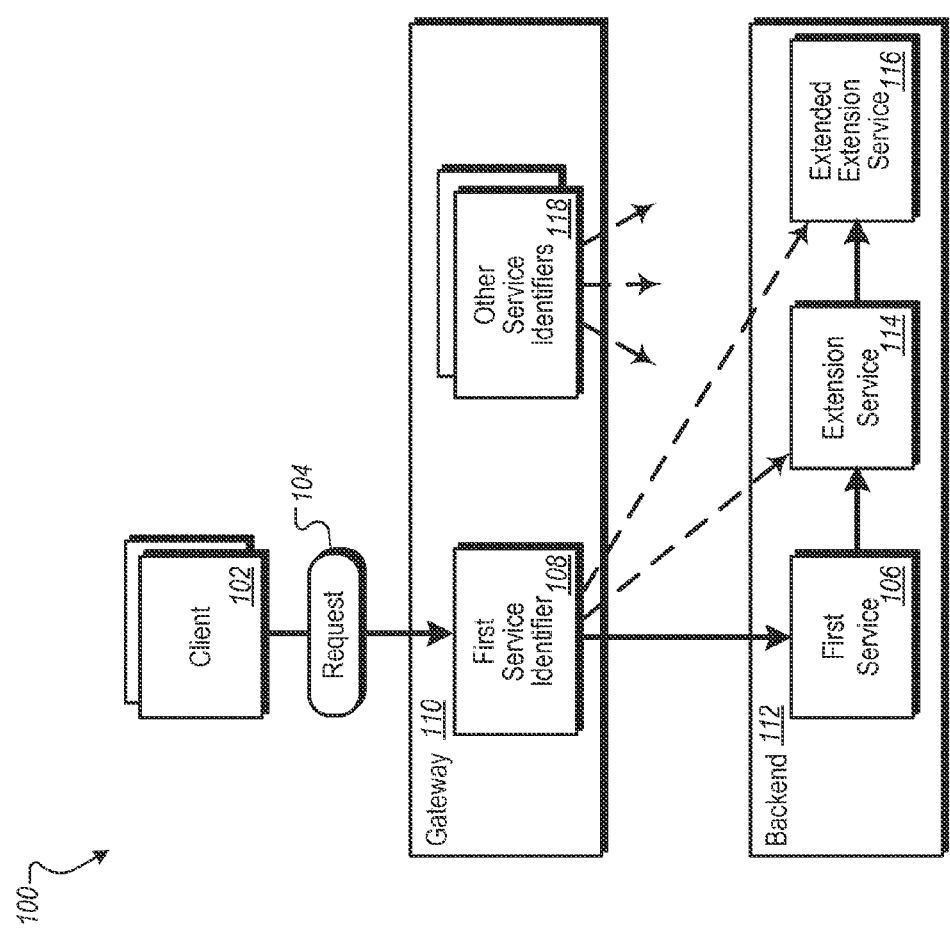
FIG. 1 is a block diagram of an example system for automatically extending a service without a change in request parameters according to an implementation.

FIG. 1 is a block diagram of a system 100 for automatically extending a service without a change in request parameters according to an implementation. For example, the system 100 includes a client 102 that can generate a request 104 for data associated with a first service 106. The request 104 includes, for example, a first service identifier 108 that identifies the first service 106. The request 104 can also identify an intended use of the requested data, such as a read-only request, or a request for the data with an ability to update the data. By making the request 104, for example, the client 102 is requesting data identified by at least the first service identifier 108 and having a first behavior associated with (and defined by) the first service 106. As an example, the request 104 can be along the lines of "Give me the data associated with service 51," which can, for example, be encapsulated in application code, such as in a call (e.g., "get(S1)" or some other service implementation or format).

Other information can also be included in the request, such as to identify particular data elements, e.g., rows in one or more tables.

In some implementations, a gateway 110 can receive the request 104 over a network (e.g., network 430 in FIG. 4) and forward the request 104 using the network to a backend 112. Typically, such as in conventional systems, if the first service 106 has not changed, the request 104 can be handled as described above, e.g., to provide the requested data associated with the first service 106 (e.g., using the first service identifier 51). However, services can be extended over time, such as to create an extension service 114 (e.g., service S1A) that is based on the first service. In order to provide data associated with an extension service, conventional systems may typically require a change in the request 104, such as a change to the extension service identifier (e.g., "get(S1A)" instead of "get(S1)"). Such a change in the request typically requires a software change or some other change. Such changes are not required, however, using the systems, techniques and methods described herein. For example, the existing interface (e.g., "get(S1)") can remain unchanged, while automatically providing the extension service 114 that extends the first service 106.

In other words, the backend 112 can serve to encapsulate any changes in a service, e.g., S1. In this way, the gateway 110 can serve as a gateway hub for received requests 104, and no changes are required at the gateway hub, including service activation, user authorization and/or backend routing, even if a service is extended (e.g., S1 extended to S1A).

For example, in response to the received request 104, the service identifier (e.g., S1) can be used to identify the extension service 114 (e.g., S1A) associated with the first service 106. The identification can occur automatically, such as based on additional registry entries for the extension service 114 without modifying original registry entries for the first service 106 and without modifying a first service implementation (e.g., "get(S1)") associated with the first service 106. As a result, data responsive to the received request can be provided to the client according to a second behavior associated with the extension service.

The second behavior may be different from the first behavior, for example, based on the use of data not available in the other behavior. For example, data models can be different between a first data model associated with the first service 106 and a second data model associated with the extension service 114. The difference in the data models, for example, can including deviating behavior associated with at least one of validation and determination. In another example, different capabilities between the first service 106 and the extension service 114 can exist, such as regarding read-only data (or fields) versus modifiable data (or fields).

In some implementations, extending a service can be repeated. For example, the extension service 114 can be extensible to an extended extension service 116 (e.g., with a service identifier of S1B). The service S1B, for example, may provide read-only access to the same fields F1-F11 as the service S1A, with the addition of providing update access, such as to field F4. In some implementations, in service names such as S1, S1A, S1B, "S1" can be the name of the service, and "A" (or "B") can be the version.

Other service identifiers 118 can exist, e.g., that are associated with other services available from the backend 112. For example, one of the other service identifiers 118 can be directly associated with the extension service 114 or to other services not shown in FIG. 1.

In some implementations, the use of services and extension services can be controlled by particular users (e.g., clients 102) and based on time and service. For example, when a service is extended, e.g., to create the extension service S1A, use of (and access to) S1A can be controlled by date, such as allowing users with automatic service extensions to begin using S1A on Jan. 1, 2015 (or when the service is switched on).

Figure 2:
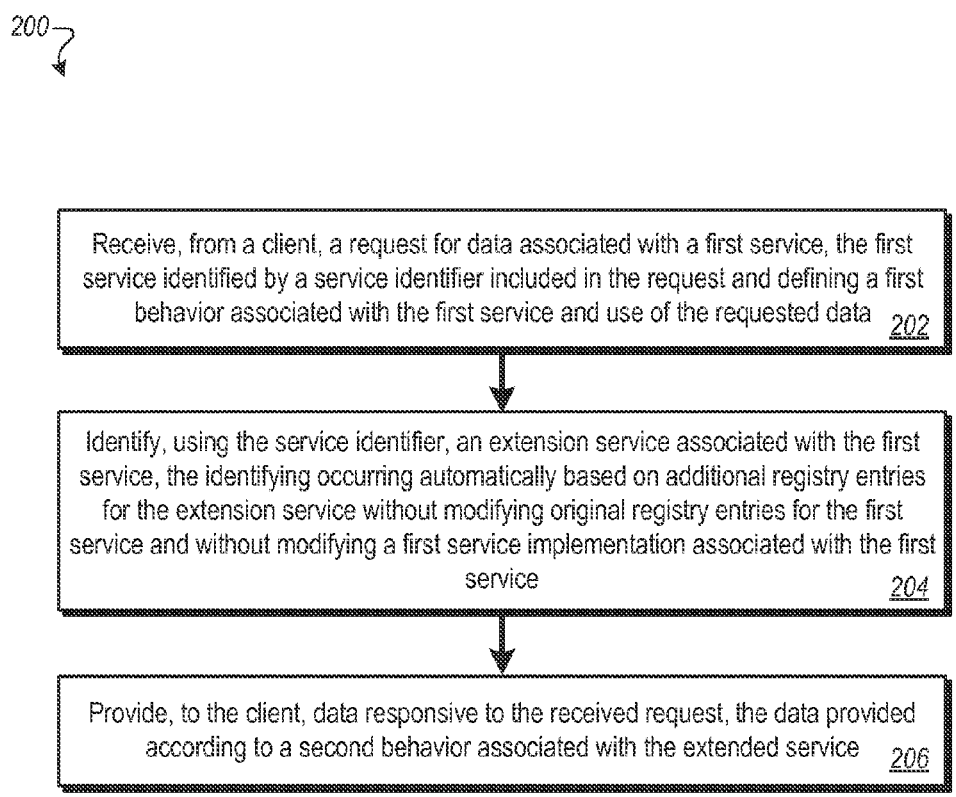
FIG. 2 is a flowchart of an example method for automatically extending a service associated with data access according to an implementation.

FIG. 2 is a flowchart of an example method 200 for automatically extending a service associated with data access according to an implementation. For clarity of presentation, the description that follows generally describes the method 200 in the context of FIG. 1. However, it will be understood that the method 200 may be performed, for example, by any other suitable system, environment, software, and hardware, or a combination of systems, environments, software, and hardware as appropriate. For example, the system 100 and/or its components can be used to execute the method 200.

At 202, a request is received from a client for data associated with a first service. As an example, the gateway 110 can receive the request 104 from the client 102 for data associated with the first service 106, such as the first service S1 that provides access to invoice data. The first service is identified by a service identifier included in the request. For example, the first service 106 can be identified by the service identifier S1. The first service defines a first behavior associated with the first service and use of the requested data. As an example, the first service 106 (e.g., S1) can be a service that provides read-only access, to a requesting client, of particular invoice data. The access may include, for example, access to invoice data fields F1-F9. The fields may be in the same table, or the fields may be spread across multiple tables and/or other data structures. The fields may also be distributed to different locations at which the underlying data may be stored.

At 204, using the service identifier, an extension service is identified that is associated with the first service. For example, registry entries for the extension service 114 (e.g., S1A) may exist that indicate that the extension service 114 is to be provided in place of the first service 106 when the service identifier S1 is provided. The identifying can occur automatically based on additional registry entries for the extension service, e.g., without modifying original registry entries for the first service and without modifying a first service implementation associated with the first service. For example, registry entries may still exist for the service S1, and the extension that occurs from S1 to S1A can occur without a coding change by the client 102 (e.g., to change get(S1) to get (S1A) or some other change). The extension service S1A, for example, can expose additional fields, such as read-only fields F10-F11.

In some implementations, identifying the extension service that is associated with the first service can include operations that occur at a gateway and a backend. For example, FIG. 3, described below, provides example steps for identifying the extension service using the gateway 110 and the backend 112.

At 206, data is provided to the client responsive to the received request. For example, the data returned by the gateway 110 to the client 102 can be the invoice data associated with the extension service 114, e.g., that includes additional read-only fields F10 and F11. The data is provided according to a second behavior associated with the extension service. For example, the second behavior can allow read-only access to all of the fields F1-F11.

In some implementations, the method 200 further includes defining the extension service, based on the first service and associated with the service identifier, and registering the extension service for use by clients. For example, using one or more interfaces (e.g., including using a modeling tool and/or a graphical user interface), the service S1 can be extended to include fields F10-F11 to create the service S1A. The resulting service S1A can be registered, e.g., for immediate use by clients 102 that already use the service S1.

In some implementations, the extension service is assigned to a software component and the extension service is used automatically after installing the software component on the backend; and enabling or disabling the software component by a configuration switch instead of installing/de-installing the software component.

Figure 3:
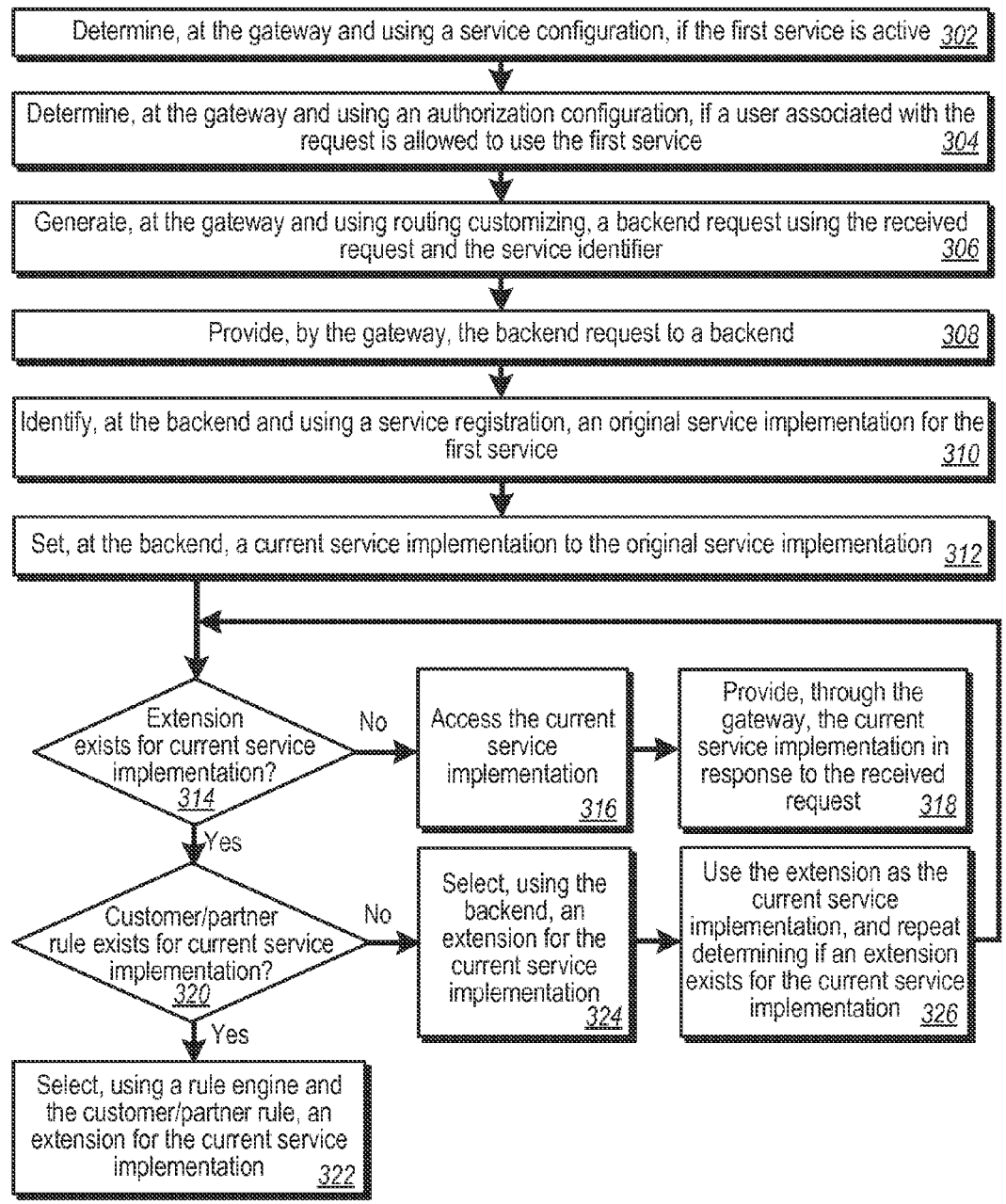
FIG. 3 is a flowchart of an example method for identifying the extension service that is associated with the first service according to an implementation.

FIG. 3 is a flowchart of an example method 300 for identifying the extension service that is associated with the first service according to an implementation. For example, the method 300 can be used for identifying the extension service identified at 204 in the method 200. For clarity of presentation, the description that follows generally describes the method 300 in the context of FIG. 1. However, it will be understood that the method 300 may be performed, for example, by any other suitable system, environment, software, and hardware, or a combination of systems, environments, software, and hardware as appropriate. For example, the system 100 and/or its components can be used to execute the method 300.

At 302, a determination is made, at the gateway and using a service configuration, if the first service is active. For example, the gateway 110 can determine if the service S1, identified in the request 104, is active.

At 304, a determination is made, at the gateway and using an authorization configuration, if a user associated with the request is allowed to use the first service. The gateway 110 can determine, for example, if the user associated with the client 102 has authorization to use the first service (e.g., S1).

At 306, at the gateway and using routing customizing, a backend request is generated using the received request and the service identifier. As an example, the gateway 110 can generate a request for use by the backend 112, the request being a request for an authorized service (e.g., for the given user) and identifying S1 (as the first service identifier 108) as the service being requested.

At 308, the backend request is provided by the gateway to a backend. For example, the gateway 110 can provide pre-authorized request to the backend 112.

At 310, at the backend and using a service registration, an original service implementation is identified for the first service. The backend 112, for example, can identify the implementation associated with the requested service, e.g., identifying the fields F1-F9 to which read-only access is to be provided.

At 312, at the backend for example, a current service implementation is set to the original service implementation. For example, as a first step in a process to identify or resolve the extension service for the requested service S1, S1 is identified to be used as a starting point for identifying extension service S1A, and the current service implementation is set to S1. If a determination is ultimately made that an additional extension service exists for the extension service S1A, then the current service implementation can be set to S1A, and so on recursively, until an extension is identified that does not itself have an extension.

At 314, a determination is made, using the service registration, if an extension exists for the current service implementation. For example, the extension identifier S1 can be used to determine if a registered extension service exists for S1, which is the case in the current example, as S1A can be looked up as the extension of S1. Determining that the extension exists can also include, for example, determining that the extension is active and ready to be used.

At 316 (when an extension does not exist for the current service implementation), the current service implementation is accessed. For example, in the situation in which S1 is not extended by S1A, S1 is used to access the current service implementation (e.g., read-only access to fields F1-F9). At 318, the current service implementation is provided, through the gateway, in response to the received request. For example, the client 102 can receive the requested data, e.g., the data associated with the service identifier S1, which in this case is not extended.

At 320 (e.g., when, based on the determination made at 314, an extension exists for the current service implementation), a determination is made if a customer/partner rule exists for the current service implementation. For example, the customer/partner rule, if one exists, is to be used for determining an appropriate extension service, based on the customer/partner rule.

At 322 (e.g., when a customer/partner rule exists for the current service implementation), a rule engine can use the customer/partner rule to select an extension for the current service implementation.

When, as determined at 320, a customer/partner rule does not exist for the current service implementation, at 324, using the backend, an extension is selected for the current service implementation. For example, the extension S1A is selected for the service S1. At 326, the extension is used as the current service implementation, and the process is repeated, e.g., determining if an extension exists for the current service implementation. For example, the method can resume at 314, e.g., using S1A as the current service implementation.

Figure 4:
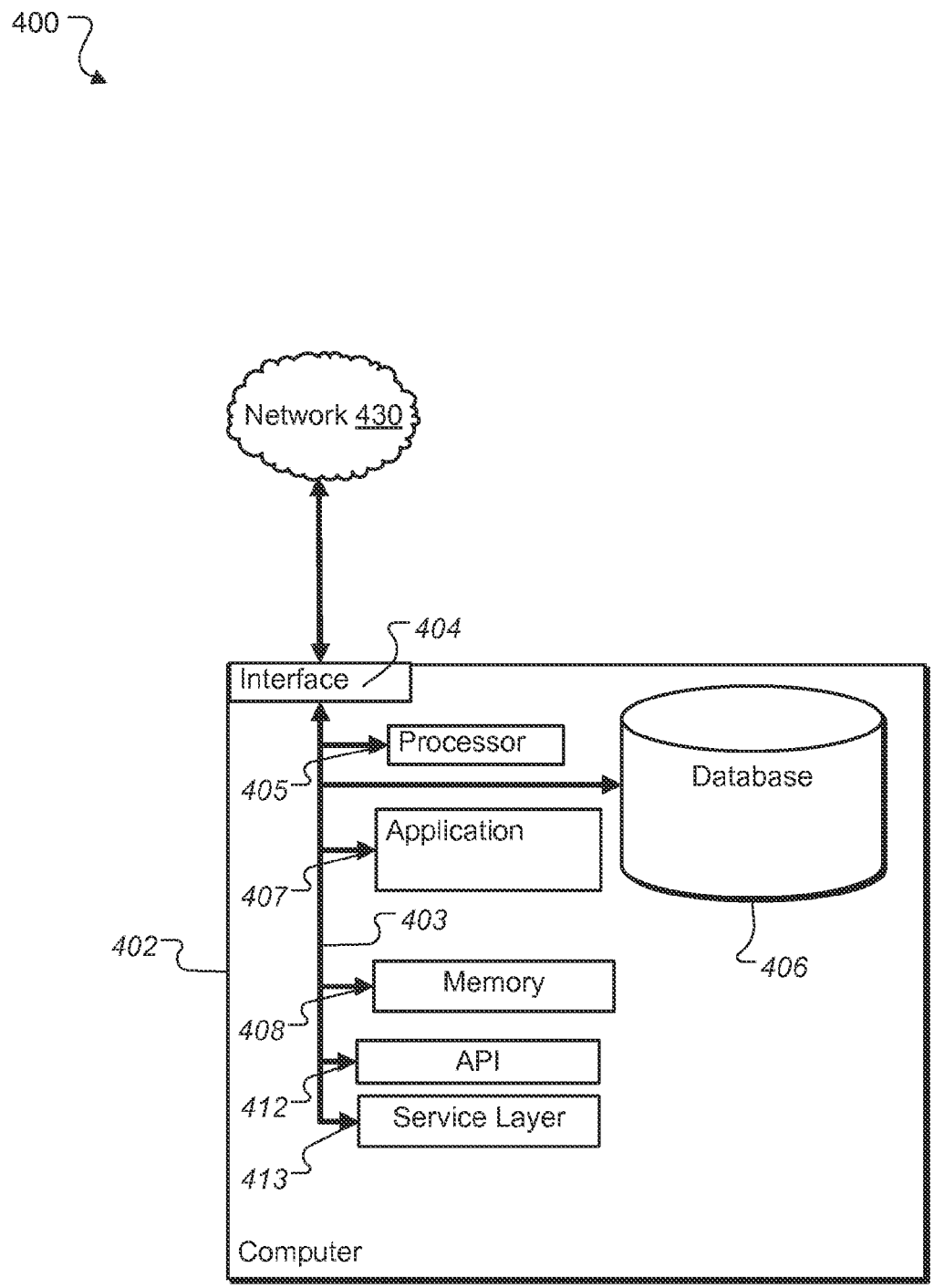
FIG. 4 is a block diagram of an example computer used in the system of FIG. 1 according to an implementation.

FIG. 4 is a block diagram 400 of an exemplary computer 402 used in the system 100 of FIG. 1 according to an implementation. The illustrated computer 402 is typically of a mobile design, but is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 402 may comprise a computer that includes an input device, such as a keypad, keyboard, touch screen, or other device that can accept user information, and an output device that conveys information associated with the operation of the computer 402, including digital data, visual and/or audio information, or a GUI.

The computer 402 can process for/serve as a client/server (or both) and/or any other component of the system 100 (whether or not illustrated). The illustrated computer 402 is communicably coupled with a network 430. In some implementations, one or more components of the computer 402 may be configured to operate within a cloud-computing-based environment.

At a high level, the computer 402 is an electronic computing device operable to receive, transmit, process, store, or manage data and information associated with the system 100. According to some implementations, the computer 402 may also include or be communicably coupled with a cloud-computing server, application server, e-mail server, web server, caching server, streaming data server, business intelligence (BI) server, and/or other server.

The computer 402 can receive requests over network 430 from a client application (e.g., a browser, native application, etc.) executing on a client (e.g., client 102 executing on another computer 402) and responding to the received requests by processing the said requests in an appropriate software application(s). In addition, requests may also be sent to the computer 402 from internal users (e.g., from a command console or by other appropriate access method), external or third-parties, other automated applications, as well as any other appropriate entities, individuals, systems, or computers.

In some implementations, each of the components of the computer 402 can communicate using a system bus 403. In some implementations, any and/or all the components of the computer 402, both hardware and/or software, may interface with each other and/or the interface 404 over the system bus 403 using an API 412 and/or a service layer 413. The API 412 may include specifications for routines, data structures, and object classes. The API 412 may be either computer-language independent or dependent and refer to a complete interface, a single function, or even a set of APIs. The service layer 413 provides software services to the computer 402 and/or the system 100. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 and/or the service layer 314 as stand-alone components in relation to other components of the computer 402 and/or system 100. Moreover, any or all parts of the API 412 and/or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402 and/or system 100. The interface 404 is used by the computer 402 for communicating with other systems in a distributed environment—including within the system 100—connected to the network 430 (whether illustrated or not). Generally, the interface 404 comprises logic encoded in software and/or hardware in a suitable combination and operable to communicate with the network 430. More specifically, the interface 404 may comprise software supporting one or more communication protocols associated with communications such that the network 430 or interface's hardware is operable to communicate physical signals within and outside of the illustrated system 100.

The computer 402 includes a processor 405. Although illustrated as a single processor 405 in FIG. 4, two or more processors may be used according to particular needs, desires, or particular implementations of the computer 402 and/or the system 100. Generally, the processor 405 executes instructions and manipulates data to perform the operations of the computer 402. Specifically, the processor 405 executes the functionality required for automatically extending a service associated with data access.

The computer 402 also includes a database 406 and memory 408 that hold data for the computer 402 and/or other components of the system 100. Although illustrated as a single database 406 and memory 408 in FIG. 4, two or more databases 408 and memories 408 may be used according to particular needs, desires, or particular implementations of the computer 402 and/or the system 100. While database 408 and memory 408 are illustrated as integral components of the computer 402, in alternative implementations, the database 406 and memory 408 can be external to the computer 402 and/or the system 100. In some implementations, the database can be a conventional database or an in-memory database, or a mix of both. In some implementations, the database 406 and memory 408 can be combined into one component.

The application 407 is an algorithmic software engine providing functionality according to particular needs, desires, or particular implementations of the computer 402 and/or the system 100, particularly with respect to functionalities required for automatically extending a service associated with data access. Further, although illustrated as a single application 407, the application 407 may be implemented as multiple applications 407 on the computer 402. In addition, although illustrated as integral to the computer 402, in alternative implementations, the application 407 can be external to the computer 402 and/or the system 100.

There may be any number of computers 402 associated with, or external to, the system 100 and communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. While the preceding figures and accompanying description illustrate example processes and computer implementable techniques, environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

Accordingly, the above description of example implementations does not define or constrain this disclosure. Other changes, substitutions, and alterations are also possible without departing from the spirit and scope of this disclosure.

What is claimed is:

1. A method, comprising:
receiving, from a client, a request for data associated with a first service, the first service identified by a service identifier included in the request and defining a first behavior associated with the first service and use of the requested data;
identifying, using the service identifier, an extension service associated with the first service, the identifying occurring automatically based on additional registry entries for the extension service without modifying original registry entries for the first service and without modifying a first service implementation associated with the first service; and
providing, to the client, data responsive to the received request, the data provided according to a second behavior associated with the extension service, wherein a difference between the first behavior and the second behavior includes use of data not available in the other behavior, including one or more of:
a difference between a first data model associated with the first service and a second data model associated with the extension service, including deviating behavior associated with at least one of validation and determination; and
different capabilities between the first service and the extension service regarding read-only versus modifiable data.

2. The method of claim 1, wherein identifying the extension service includes:
determining, at the gateway and using a service configuration, if the first service is active;
determining, at the gateway and using an authorization configuration, if a user associated with the request is allowed to use the first service;
generating, at the gateway and using routing customizing, a backend request using the received request and the service identifier;
providing, by the gateway, the backend request to a backend;
identifying, at the backend and using a service registration, an original service implementation for the first service; and
setting, at the backend, a current service implementation to the original service implementation.

3. The method of claim 2, wherein identifying the extension service further includes:
determining, using the service registration, if an extension exists for the current service implementation; and
when an extension does not exist for the current service implementation:
accessing the current service implementation; and
providing, through the gateway, the current service implementation in response to the received request.

4. The method of claim 3, wherein identifying the extension service further includes:
when an extension exists for the current service implementation:
determining if a customer/partner rule exists for the current service implementation;
when a customer/partner rule exists for the current service implementation:
selecting, using a rule engine and the customer/partner rule, an extension for the current service implementation; and
when a customer/partner rule does not exist for the current service implementation:
selecting, using the backend, an extension for the current service implementation; and
using the extension as the current service implementation and repeating determining if an extension exists for the current service implementation.

5. The method of claim 1, further comprising;
defining the extension service, based on the first service and associated with the service identifier; and
registering the extension service for use by clients.

6. The method of claim 5, wherein creating the extension service includes using a modeling tool.

7. The method of claim 1, wherein the extension service is extensible to an extended extension service.

8. The method of claim 1, wherein the service identifier includes a name and a version.

9. The method of claim 1, wherein:
the extension service is assigned to a software component and the extension service is used automatically after installing the software component on the backend; and
enabling or disabling the software component by a configuration switch instead of installing/de-installing the software component.

10. A computer system comprising:
memory operable to store content, including static and dynamic content; and
at least one hardware processor interoperably coupled to the memory and operable to perform instructions to:
receive, from a client, a request for data associated with a first service, the first service identified by a service identifier included in the request and defining a first behavior associated with the first service and use of the requested data;
identify, using the service identifier, an extension service associated with the first service, the identifying occurring automatically based on additional registry entries for the extension service without modifying original registry entries for the first service and without modifying a first service implementation associated with the first service; and
provide, to the client, data responsive to the received request, the data provided according to a second behavior associated with the extension service, wherein a difference between the first behavior and the second behavior includes use of data not available in the other behavior, including one or more of:

a difference between a first data model associated with the first service and a second data model associated with the extension service, including deviating behavior associated with at least one of validation and determination; and different capabilities between the first service and the extension service regarding read-only versus modifiable data.

11. The computer system of claim 10, wherein identifying the extension service includes:

determining, at the gateway and using a service configuration, if the first service is active;

determining, at the gateway and using an authorization configuration, if a user associated with the request is allowed to use the first service;

generating, at the gateway and using routing customizing, a backend request using the received request and the service identifier;

providing, by the gateway, the backend request to a backend;

identifying, at the backend and using a service registration, an original service implementation for the first service; and setting, at the backend, a current service implementation to the original service implementation.

12. The computer system of claim 11, wherein identifying the extension service further includes:

determining, using the service registration, if an extension exists for the current service implementation; and when an extension does not exist for the current service implementation:

accessing the current service implementation; and providing, through the gateway, the current service implementation in response to the received request.

13. The computer system of claim 12, wherein identifying the extension service further includes:

when an extension exists for the current service implementation:

determining if a customer/partner rule exists for the current service implementation;

when a customer/partner rule exists for the current service implementation:

selecting, using a rule engine and the customer/partner rule, an extension for the current service implementation; and when a customer/partner rule does not exist for the current service implementation:

selecting, using the backend, an extension for the current service implementation; and using the extension as the current service implementation and repeating determining if an extension exists for the current service implementation.

14. The computer system of claim 10, further comprising instructions to;

define the extension service, based on the first service and associated with the service identifier; and register the extension service for use by clients.

15. The computer system of claim 14, wherein creating the extension service includes using a modeling tool.

16. The computer system of claim 10, wherein the extension service is extensible to an extended extension service.

17. The computer system of claim 10, wherein the service identifier includes a name and a version.

18. The computer system of claim 10, wherein:

the extension service is assigned to a software component and the extension service is used automatically after installing the software component on the backend; and enabling or disabling the software component by a configuration switch instead of installing/de-installing the software component.

19. A computer-readable media, the computer-readable media comprising computer-readable instructions embodied on tangible, non-transitory media, the instructions operable when executed by at least one computer to:

receive, from a client, a request for data associated with a first service, the first service identified by a service identifier included in the request and defining a first behavior associated with the first service and use of the requested data;

identify, using the service identifier, an extension service associated with the first service, the identifying occurring automatically based on additional registry entries for the extension service without modifying original registry entries for the first service and without modifying a first service implementation associated with the first service; and provide, to the client, data responsive to the received request, the data provided according to a second behavior associated with the extension service, wherein a difference between the first behavior and the second behavior includes use of data not available in the other behavior, including one or more of:

a difference between a first data model associated with the first service and a second data model associated with the extension service, including deviating behavior associated with at least one of validation and determination; and different capabilities between the first service and the extension service regarding read-only versus modifiable data.

20. The computer-readable media of claim 19, wherein identifying the extension service includes:

determining, at the gateway and using a service configuration, if the first service is active;

determining, at the gateway and using an authorization configuration, if a user associated with the request is allowed to use the first service;

generating, at the gateway and using routing customizing, a backend request using the received request and the service identifier;

providing, by the gateway, the backend request to a backend;

identifying, at the backend and using a service registration, an original service implementation for the first service; and setting, at the backend, a current service implementation to the original service implementation.

21. The computer-readable media of claim 20, wherein identifying the extension service further includes:

determining, using the service registration, if an extension exists for the current service implementation; and when an extension does not exist for the current service implementation:

accessing the current service implementation; and providing, through the gateway, the current service implementation in response to the received request.

22. The computer-readable media of claim 21, wherein identifying the extension service further includes:

when an extension exists for the current service implementation:

determining if a customer/partner rule exists for the current service implementation;

when a customer/partner rule exists for the current service implementation:

selecting, using a rule engine and the customer/partner rule, an extension for the current service implementation; and when a customer/partner rule does not exist for the current service implementation:

selecting, using the backend, an extension for the current service implementation; and using the extension as the current service implementation and repeating determining if an extension exists for the current service implementation.

23. The computer-readable media of claim 19, further comprising instructions to;

define the extension service, based on the first service and associated with the service identifier; and register the extension service for use by clients.

24. The computer-readable media of claim 19, wherein:

the extension service is assigned to a software component and the extension service is used automatically after installing the software component on the backend; and enabling or disabling the software component by a configuration switch instead of installing/de-installing the software component.

* * * * *